United States Patent [19]
Knepper et al.

[11] Patent Number: 5,618,357
[45] Date of Patent: Apr. 8, 1997

[54] ALUMINUM-BASED SOLDER MATERIAL

[75] Inventors: Peter Knepper, Ganderkesee; Olaf Scheffler, Bremen, both of Germany

[73] Assignee: Daimler-Benz Aerospace Airbus GmbH, Hamburg, Germany

[21] Appl. No.: 493,672

[22] Filed: Jun. 22, 1995

[30] Foreign Application Priority Data

Jun. 22, 1994 [DE] Germany .................... 44 21 732.3

[51] Int. Cl.⁶ ............................ C22C 21/00; B23K 35/28
[52] U.S. Cl. ................... 148/528; 148/535; 148/440; 420/546; 420/556; 228/262.51
[58] Field of Search .................... 148/516, 528, 148/535, 440; 420/546, 556; 228/262.51

[56] References Cited

U.S. PATENT DOCUMENTS 5,158,621  10/1992  Das et al. ..................... 148/528
5,286,314  2/1994   Das et al. ..................... 148/528

FOREIGN PATENT DOCUMENTS 62-38796  2/1987  Japan.

*Primary Examiner*—George Wyszomierski
*Attorney, Agent, or Firm*—W. G. Fasse; W. F. Fasse

[57] ABSTRACT

A solder material that is especially suitable for the fluxless hard soldering of aluminum-based components consists of an aluminum-based alloy that especially contains about 10 to 50 wt. % of germanium, about 1 to 12 wt. % of silicon, about 0.1 to 3 wt. % of magnesium, and about 0.1 to 3 wt. % of indium. The solder material is useful at soldering temperatures in the range from 424° to about 600° C., and is therefore especially suitable for the fluxless hard soldering of components made of precipitation-hardened high-strength aluminum-based materials.

20 Claims, No Drawings

ALUMINUM-BASED SOLDER MATERIAL

FIELD OF THE INVENTION

The invention relates to a solder material that consists of an aluminum-based alloy that further contains germanium, magnesium and silicon, which is especially suitable for the fluxless hard soldering or brazing of aluminum-based components.

BACKGROUND INFORMATION

Several problems arise when hard soldering or brazing aluminum materials using a brazing or solder material of the prior art. For example, the outer surface of the aluminum material becomes covered with an oxide skin, which must be removed immediately before wetting the aluminum material with the solder, in order to achieve an acceptable solder joint. Due to the relatively large affinity of the aluminum to oxygen under normal environmental conditions, the oxide skin is very quickly re-formed even after it has been removed. Other problems in soldering such aluminum materials result due to the very low melting temperature of the materials. For example, the solidus temperature of the base material, which cannot be reached or exceeded during the soldering process, is about 579° C.

A typical commercially available solder material, which is known under the designation L-AlSi12, consists of an aluminum-based alloy containing approximately 12% of silicon. This known solder material has a working temperature of 590° C. for example, and is therefore not suitable for many applications. Furthermore, this known solder material must be used with a flux for removing the oxide skin that forms on the aluminum components.

Other solder materials are known for carrying out fluxless hard soldering. Such known solder materials also consist of an aluminum-based alloy containing silicon and germanium as further alloying elements. Such solder materials are used for the fluxless hard soldering of aluminum components having a solidus temperature over 600° C. in a vacuum or in a protective or inert gas environment. By evaporating low-melting-point metals having a greater oxygen affinity than the aluminum, the oxide skin on the surface of the aluminum components is removed in a chemical manner by a reduction reaction, that is to say, the getter effect of these low-melting-point metals is utilized to remove the oxide skin. A material that is typically used for this purpose is magnesium, which is evaporated within the inner chamber of the soldering oven. The soldering process is thereby carried out under a high vacuum at pressures of $10^{-3}$ to $10^{-4}$ hPa.

It is further known to carry out fluxless hard soldering of aluminum under a protective or inert gas with a dew point of less than −60° C. and an oxygen content of less than 10 ppm, or in a vacuum of $10^{-2}$ to $10^{-3}$ hPa. In such a known process, the solder material must include wetting enhancing elements such as antimony, barium, beryllium, strontium and/or bismuth. Furthermore, it is usually necessary to carry out a corrosive degreasing step to clean the components to be joined before carrying out the soldering process.

U.S. Pat. No. 5,158,621 (Das et al.) issued Oct. 27, 1992 and U.S. Pat. No. 5,286,314 (Das et al.) issued Feb. 15, 1994 disclose solder material alloys within the above described general field, which were especially developed for soldering aluminum-based alloys of the Al-Fe-V-Si type produced by powder metallurgy techniques. Those disclosed solder materials are provided in the form of thin foils that are arranged at the joints to be soldered.

Japanese Patent Document JP 62-38796, as summarized in the Patent Abstracts of Japan, M-609, Vol. 11, No. 225 (1987) discloses an aluminum-based solder material that may contain from 0.01 wt. % to 1 wt. % of indium. The solder alloy may contain no germanium at all, or up to 1 wt. % of germanium. However, in the alloy containing indium, the total content of indium and germanium together is limited to a maximum of 1 wt. %.

OBJECTS OF THE INVENTION

In view of the above it is the aim of the invention to achieve the following objects singly or in combination:

to provide an improved solder material that is especially suitable for solder joining high-strength aluminum-based materials produced by conventional methods and having a solidus temperature of less than 600° C.;

to provide such an improved solder material that has a melting temperature interval in the range from 416° to 549° C.;

to provide such an improved solder material that is especially suitable for carrying out fluxless hard soldering;

to provide an improved solder material that reduces or avoids the occurrence of the above described problems relating to formation of an oxide skin on the components to be soldered;

to avoid the need of antimony, barium, beryllium, strontium, and/or bismuth as special wetting enhancing elements in such a solder material; and to provide an improved method of hard soldering two aluminum-based components by using such an improved solder material.

SUMMARY OF THE INVENTION

The above objects have been achieved according to the invention by an improved solder material consisting of an aluminum-based alloy comprising aluminum, silicon, magnesium, 10 wt. % to 50 wt. % of germanium, and about 0.1 wt. % to about 3 wt. % of indium.

A solder material with a composition in the present ranges has been found to have excellent properties of a relatively low melting temperature combined with a good wetting characteristic and avoidance of oxidation problems even without the use of a flux. The present solder material has been found to be especially suitable for soldering precipitation-hardened high-strength aluminum alloys, which are typically used in aircraft construction and which typically contain copper, silicon, magnesium, zinc or lithium as the primary alloying elements.

DETAILED DESCRIPTION OF PREFERRED EXAMPLE EMBODIMENTS AND OF THE BEST MODE OF THE INVENTION

The solder material according to the invention consists of an alloy based on aluminum and further having a germanium content of 10 to 50 wt. %, a silicon content of 1 to about 12 wt. %, and a magnesium content of about 0.1 to 3 wt. % and further including an addition of about 0.1 to 3 wt. % of indium. A particular composition that has been found to be especially advantageous has about 20 wt. % of germanium, 7.5 wt. % of silicon, 1 wt. % of indium and 0.5 wt. % of magnesium (AlGe20Si7.5In1Mg0.5). This particular solder alloy composition has a melting temperature interval of 416° to 549° C., i.e. both a solidus and liquidus temperature within this range, and can be used at a soldering or working temperature of about 560° C. In general, the present solder materials can be used at a soldering or working temperature within the range from 424° to about 600° C.

A soldering process using the solder material according to the invention for joining components made of a high-strength aluminum-based material can be carried out in a high temperature soldering oven, for example. The components to be joined are first positioned in a suitable apparatus, e.g. a holding jig. Next, the present solder material is applied at the area of the joint to be formed. The present solder material can thereby be provided in the form of a powder, foils, wires, or rods, as most suitable, which is then deposited on the areas of the components to be joined. It is further possible, but not necessary, to use a binder system or flux material.

Next, the properly positioned orientation of the components is fixed by the holding jig. Then, the components carried by the jig are placed into the oven and heated to the respectively required soldering temperature. In this context, it is noted that the holding jig is constructed so as to account for the temperature induced expansion of the material of the components. After the required soldering temperature is maintained for a determined period of time, the oven is allowed to cool down, so that the components are cooled to room temperature. After the oven chamber is opened, the holding jig is removed and unclamped, whereupon the now-joined components are removed.

When the soldering process is to be carried without a flux, a slightly different procedure applies. Namely, the components are positioned in a vacuum oven, which is then evacuated to a remaining gas pressure of approximately $5\times10^{-4}$ hPa and thereafter heated to the required soldering temperature. After the elevated temperature has been maintained for a required period of time, the components are cooled to room temperature while a protective or inert gas such as argon or helium is introduced into the oven chamber by a pump system.

Although the invention has been described with reference to specific example embodiments, it will be appreciated that it is intended to cover all modifications and equivalents within the scope of the appended claims.

What is claimed is:

1. A solder composition consisting of an aluminum-based alloy comprising aluminum, magnesium, silicon, 10 wt. % to 50 wt. % of germanium, and about 0.1 wt. % to about 3 wt. % of indium.

2. The solder composition of claim 1, containing about 0.1 wt. % to about 3 wt. % of said magnesium.

3. The solder composition of claim 2, containing about 1 wt. % to about 12 wt. % of said silicon.

4. The solder composition of claim 1, containing about 1 wt. % to about 12 wt. % of said silicon.

5. The solder composition of claim 1, containing about 20 wt. % of said germanium, about 7.5 wt. % of said silicon, about 1 wt. % of said indium, about 0.5 wt. % of said magnesium, and the remainder being said aluminum and trace amounts of unavoidable impurities.

6. The solder composition of claim 5, having both a solidus point and a liquidus point in the temperature range from 416° C. to 549° C.

7. The solder composition of claim 5, having a melting characteristic that enables soldering at a temperature of about 560° C.

8. The solder composition of claim 1, having both a solidus point and a liquidus point in the temperature range from 416° C. to 549° C.

9. The solder composition of claim 1, having a melting characteristic that enables soldering at a temperature in the range from about 424° C. to about 600° C.

10. The solder composition of claim 1, consisting of said aluminum, said magnesium, said silicon, said germanium and said indium, and trace amounts of unavoidable impurities.

11. The solder composition of claim 1, having a soldering characteristic suitable for the fluxless hard soldering of aluminum components.

12. The solder composition of claim 1, in the form of a powder.

13. The solder composition of claim 1, containing at least about 0.1 wt. % of said magnesium and at least about 1 wt. % of said silicon.

14. The solder composition of claim 13, wherein said aluminum makes up the balance of said composition.

15. A method of hard soldering two aluminum-based components using a solder composition consisting of an aluminum-based alloy containing aluminum, magnesium, silicon, 10 wt. % to 50 wt. % of germanium, and about 0.1 wt. % to about 3 wt. % of indium, said method comprising:

a) positioning said components proximate each other at a joint area thereof;

b) applying said solder composition to said components at said joint area;

c) heating at least said joint area of said components and said solder composition to a temperature in the range of 424° C. to about 600° C.; and d) cooling said components and said solder composition to room temperature.

16. The method of claim 15, wherein said method does not include applying a flux to said joint area, and further comprising placing said components in a vacuum oven and evacuating said oven before said heating step c).

17. The method of claim 16, further comprising introducing an inert gas into said vacuum oven during said cooling step d).

18. The method of claim 15, wherein said temperature of said step c) is about 560° C.

19. The method of claim 15, wherein said components comprise at least one precipitation-hardened high-strength aluminum-based alloy.

20. The method of claim 15, being a fluxless hard soldering method that does not include applying a flux to said joint area.

* * * * *